United States Patent [19]

Takamoro

[11] Patent Number: 5,170,479
[45] Date of Patent: Dec. 8, 1992

[54] FILE BLOCK MANAGING SYSTEM USING NEXT RECORD HEADER POSITION DATA AND DELETE HISTORY DATA FROM BLOCK HEADER AND RECORD HEADERS TO LOCATE REQUESTED RECORD BLOCK

[75] Inventor: Hitoshi Takamoro, Tokyo, Japan

[73] Assignee: Kabushiki Kaisha Toshiba, Kawasaki, Japan

[21] Appl. No.: 554,066

[22] Filed: Jul. 16, 1990

Related U.S. Application Data

[63] Continuation of Ser. No. 29,900, Mar. 25, 1987, abandoned.

Foreign Application Priority Data

Mar. 25, 1986 [JP] Japan ............................ 61-66263

[51] Int. Cl.⁵ ................................ G06F 15/40
[52] U.S. Cl. ............... 395/600; 364/DIG. 1; 364/283.1; 364/261.2; 364/254.3; 364/254.6; 395/800
[58] Field of Search ............ 395/800, 425, 600

[56] References Cited

U.S. PATENT DOCUMENTS

| | | | |
|---|---|---|---|
| 4,133,041 | 1/1979 | Kashio | 395/425 |
| 4,325,120 | 4/1982 | Colley et al. | 364/200 |
| 4,430,725 | 2/1984 | Elliott et al. | 364/900 |
| 4,464,718 | 8/1984 | Dixon | 364/200 |
| 4,575,827 | 3/1986 | Kulakowski | 365/230.01 |
| 4,585,360 | 4/1986 | Ueda | 364/900 |

*Primary Examiner*—Thomas C. Lee
*Attorney, Agent, or Firm*—Oblon, Spivak, McClelland, Maier & Neustadt

[57] ABSTRACT

According to the present invention, a header includes delete history data (counter) area where a delete history of the logically subsequent record header is written in. By sequentially referring to record headers by using this data, a logical storing order of records is not destroyed even if a delete instruction is executed. In addition, the header has physical position data. Accordingly, when a squeeze instruction is executed after the delete instruction, the logical storing order of records is not destroyed and an empty area in the block can be effectively utilized.

18 Claims, 6 Drawing Sheets

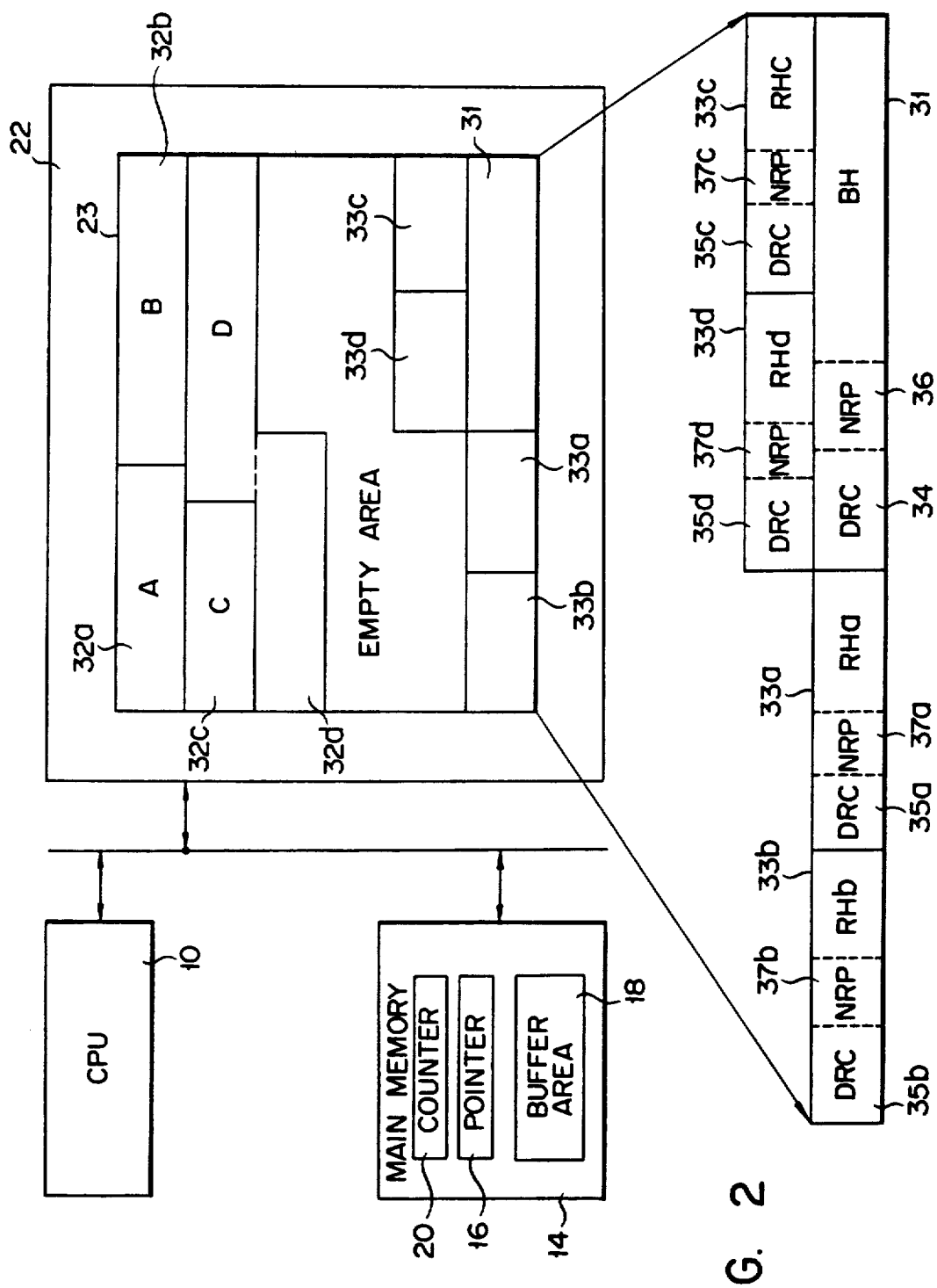
F I G. 2

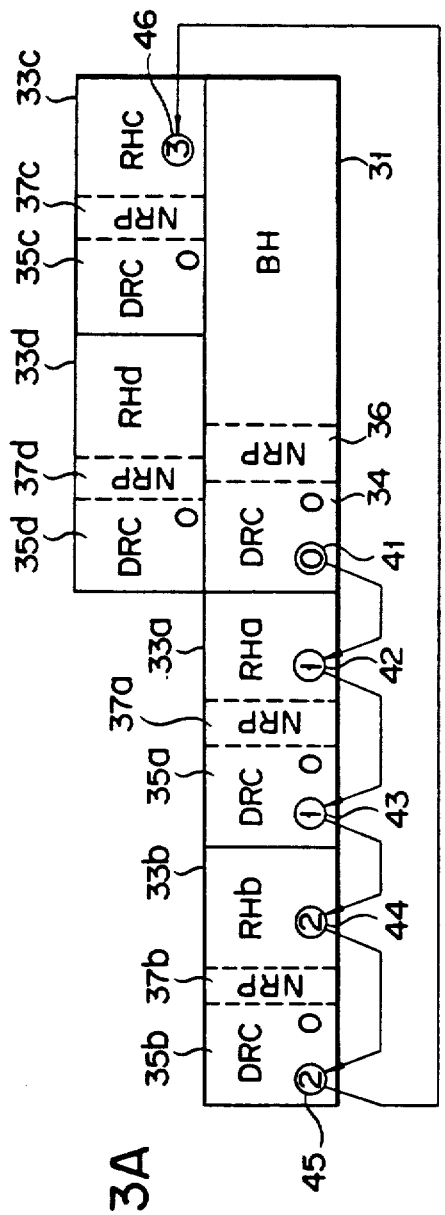
F I G. 3A
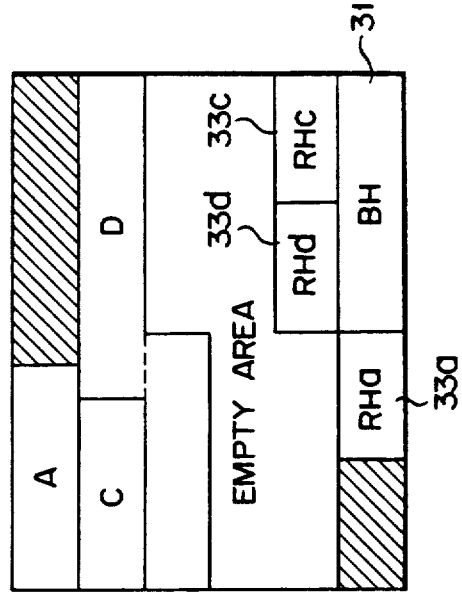
F I G. 3B

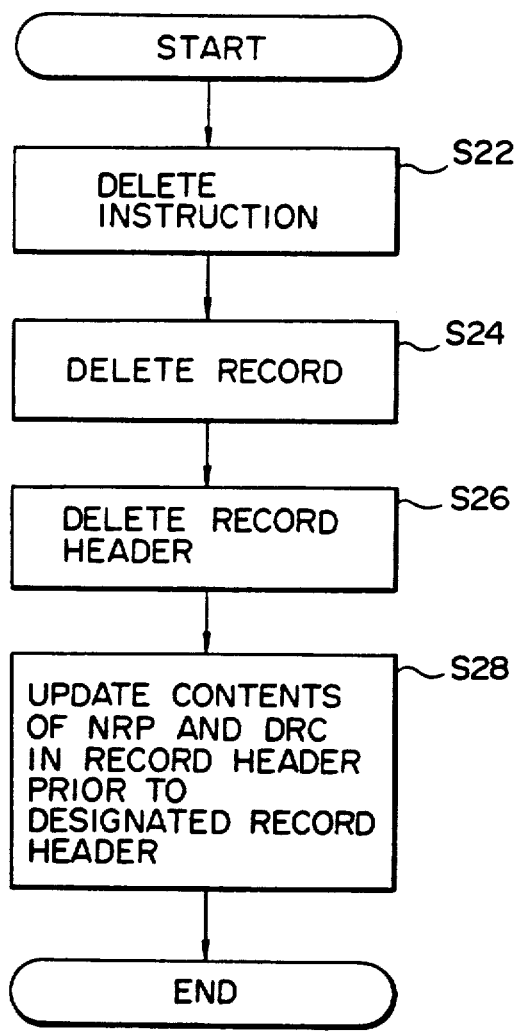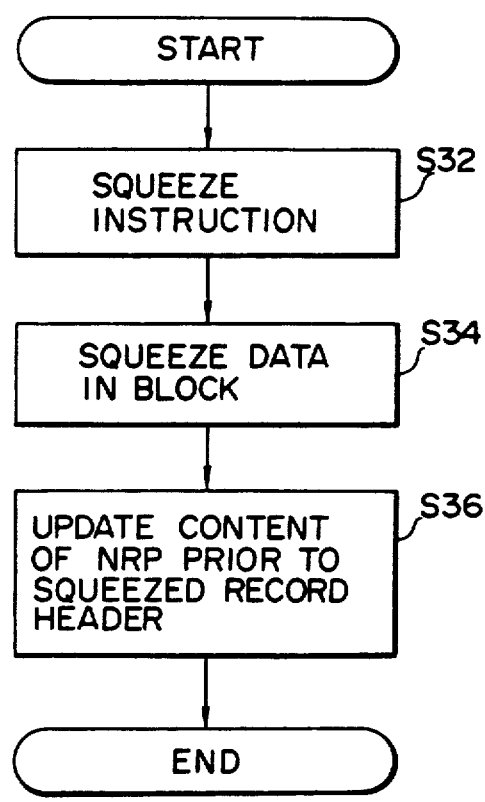
FIG. 5
FIG. 6

FILE BLOCK MANAGING SYSTEM USING NEXT RECORD HEADER POSITION DATA AND DELETE HISTORY DATA FROM BLOCK HEADER AND RECORD HEADERS TO LOCATE REQUESTED RECORD BLOCK

This application is a continuation of application Ser. No. 029,900, filed on Mar. 25, 1987, now abandoned.

BACKGROUND OF THE INVENTION

The present invention relates to a system for managing a record in a block of a recording medium in which the record in a block is managed using a block header and a record header.

A unit of data transfer between a recording medium, e.g., a magnetic recording device and a main memory is a file block. Conventionally, block header (BH) 11 for holding block management information for managing the entire block, at least one of records 12a (A), 12b (B), ..., stored in the block, and record headers 13a (RHa), 13b (RHb), ..., for holding record store information for identifying the record are written in the file block, as shown in FIG. 1A.

In a conventional system for managing a record in a block, header 11 is located at a leading area of the block as shown in FIGS. 1A to 1C, and headers 13a, 13b, ..., are stored in areas subsequent to header 11 so as to make a pair with corresponding records 12a, 12b, ..., in accordance with a criterion such as a record number and the like.

In a system for managing a record in a block of this type, in order to search for a record having a variable size in a block, no method is available other than a scan search which scans from the head of the block, thereby searching for a desired record. That is, in this scan search, a record header is searched for in order to obtain a record length which is set in the record header, the next record header position is calculated in accordance with the obtained record length, and this operation is repeated to search for a desired record. Therefore, according to the scan search, a processing time is prolonged especially when a block size is large and a large number of records are stored in the block.

In order to eliminate the above problem, Japanese Patent Application No. 60-67002 by Matsunawa discloses a method, in which records are stored from the head of a block, and headers are stored from the end of the block. However, the method by Matsunawa does not disclose that the records can be managed by a logical record number even if a delete instruction of the record is executed.

In the conventional system, even when record B 12b is deleted as shown in FIG. 1B from the block shown in FIG. 1A, and even during a record squeeze (compression) operation after the record is deleted, header RHb 13b of deleted record B 12b must remain in the block, as shown in FIG. 1C, so as to maintain the logical order. For this reason, in the file where the delete operation is frequently performed, record headers of unnecessary, deleted records must be referred to in order to search for an effective record in the block at that time, and the record process time is further increased. In addition, when store/delete operations of the record are frequently performed, the record header of the deleted record remains, and an empty area in the block is decreased by an amount of the record header of the deleted record. Therefore, it is difficult to effectively utilize the block area.

Therefore, the scan search is conventionally required to search for a record in a block as described above, it is difficult to search for the record at a high speed. In addition, the record header of the deleted record must remain to maintain the logical order of the stored record. Furthermore, it is difficult to effectively utilize the block area because the record header of the deleted record must be maintained in the block.

SUMMARY OF THE INVENTION

The present invention has been made in consideration of the above situation, and has as its object to provide a system for managing a record in a block, which can search for a record in a file block at a high speed, which can maintain a logical order of records stored in the file block even when a delete instruction is executed, and which can delete a record header corresponding to the deleted record, thereby effectively utilizing a block area.

A system for managing a data file in a file block, by a central processor, in which records are sequentially stored in accordance with an input order from a head of the file block toward the end, and in which record headers each corresponding to the stored record are sequentially stored in accordance with an input order in a direction from the end of the file block toward the head subsequently to a block header at the end of the file block, comprises delete means for deleting a record and a record header, corresponding to the record, designated by a record delete instruction in accordance with the record delete instruction from the central processor, and for updating data indicating a delete history of the block header or a record header positioned immediately before the deleted record header, and search means for searching for a designated record header in response to a search instruction from the central processor in accordance with the delete history data of the block header and the record headers.

A system for managing a record in a file block, which can execute a search instruction without referring to a record header corresponding to a deleted record, comprises delete means for deleting a record designated by the delete instruction input thereto, in accordance with the delete instruction, and for updating data indicating delete history and data indicating a physical position of the next record header in a block header or a record header positioned immediately before a record header to be deleted, and search means for calculating a position of the next record header in response to a search instruction input thereto in accordance with the physical position data of the block header and the record headers, and for searching for the designated record header in accordance with the delete history data of the block header and the record header, using the calculated result.

A system for managing a record in a block, which can execute a delete instruction and a squeeze instruction without destroying a logical record order, comprises delete means for deleting a record designated by a delete instruction in accordance with the delete instruction input thereto, and updating data indicating delete history and data indicating a physical position of the next record header in a block header or a record header positioned immediately before a record header to be deleted, squeeze means for squeezing the records and the record headers in the block in accordance with a squeeze instruction input thereto, and updating the physical position data of the header positioned immediately before the record header to be squeezed, and search means for calculating a position of the next record header in response to a search instruction input thereto in accordance with the physical position data of the block header and the record header, and for searching for the designated record header in accordance with the delete history data of the block header and the record header, using the calculated position.

As described above, according to the present invention, when a record in a block is logically operated and searched for, no scan search need be performed to refer to a record header. In addition, a record header corresponding to a deleted record need not be referred to. Therefore, a record in a block can be searched for at a high speed. According to the present invention, when a record is physically deleted, a record header can be deleted from the block without destroying a logical store order of records. Therefore, an empty area in the block is increased to effectively utilize a block area.

BRIEF DESCRIPTION OF THE DRAWINGS

FIG. 2 is a block diagram of an arrangement of a system for managing a record in a block according to an embodiment of the present invention;

FIG. 3A is a view of a record storing state in a block for explaining how the record is searched for in accordance with a search instruction in the embodiment shown in FIG. 2;

FIG. 3B is a view of a record storing state in a block when a delete instruction is executed in the embodiment in FIG. 2;

FIG. 5 is a flow chart for explaining how the record is deleted in accordance with the delete instruction; and FIG. 6 is a flow chart for explaining how the record in a block is squeezed in accordance with the squeeze instruction.

PREFERRED EMBODIMENT OF THE INVENTION

Figure 1:
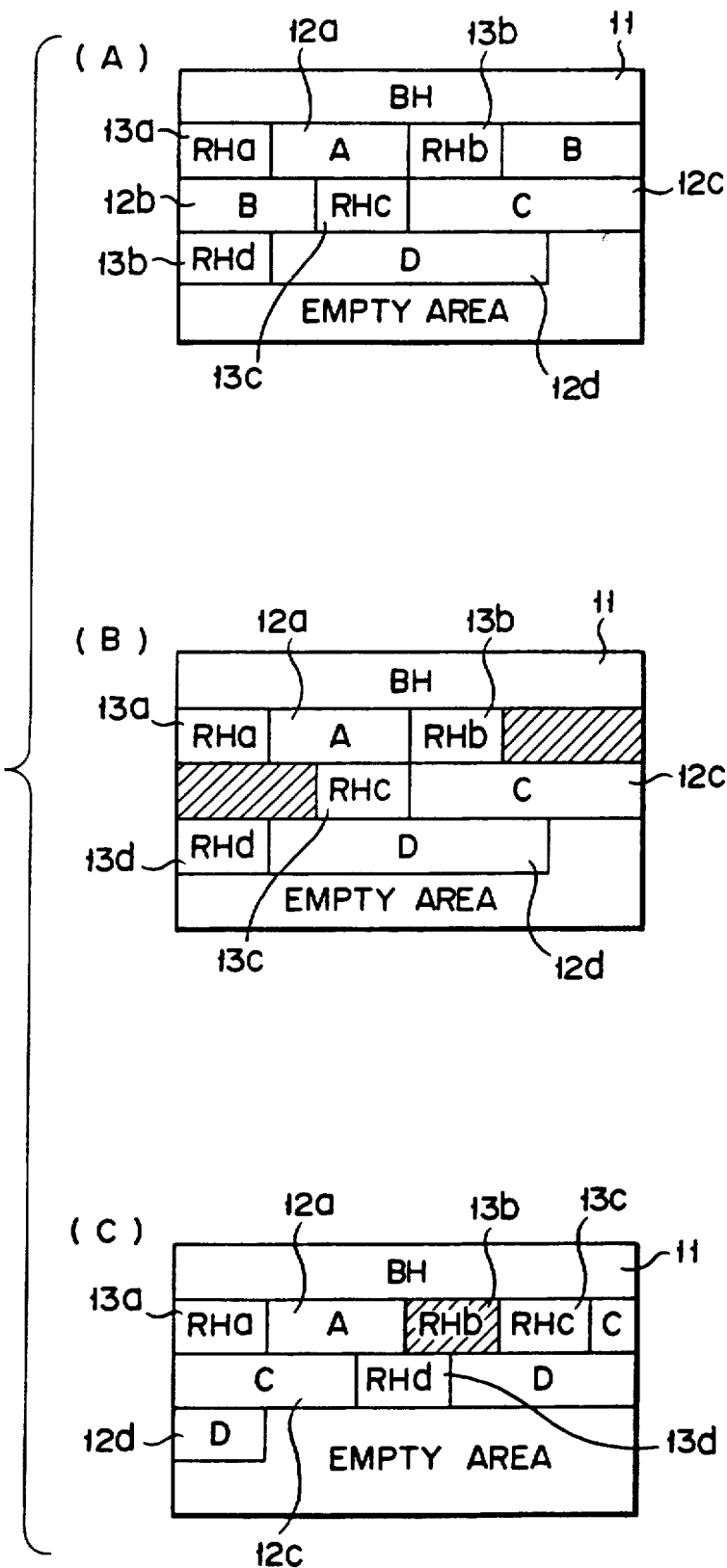
FIGS. 1A, 1B, 1C are views of a record storing state in a block for explaining transit in records of a conventional example.

A system for managing a record in a block according to a preferred embodiment of the present invention will now be described in detail with reference to the accompanying drawings.

FIG. 2 shows a block diagram of a system for managing a record, to which the present invention is applied. In FIG. 2, CPU 10 controls the entire system. A plurality of file blocks including file block 23 are placed on magnetic disk device 22. Main memory 14 has counter 20 for managing a logical record number, pointer 16 for designating a block and a position in a block, and buffer area 18 for storing data of the readout block.

An arrangement of block 23 is as follows, and other file blocks have the same arrangement. Note that in FIG. 2, the upper left side is the head of the block, and the lower right side is the end of the block.

Records are stored in the block from the head thereof in order. In this embodiment, 4 records, i.e., records 32a (A), 32b (B), 32c (C), and 32d (D) are stored. Block header 31 (BH), having a fixed length, is arranged at the end of the block for block 23. Record headers 33a (RHa), 33b (RHb), 33c (RHc), and 33d (RHd) for records 32a, 32b, 32c, and 32d, respectively, are arranged subsequent to header 31 in the order of, e.g., record numbers. In this embodiment, areas for storing records are allocated from the head of the block, and areas for storing block headers and record headers are allocated from the end of the block. Data length of the record header is fixed, and a record length of the corresponding record, a relative storing position in the block, an attribute, and the like are recorded therein.

Each header includes counter area DRC for storing data which indicates a delete history of the header to be searched for next, and next record header position data area NRP for storing relative position data which indicates a position of the next record header. That is, headers 31 and 33a to 33d have areas DRC 34 and 35a to 35d.

Figure 3C:
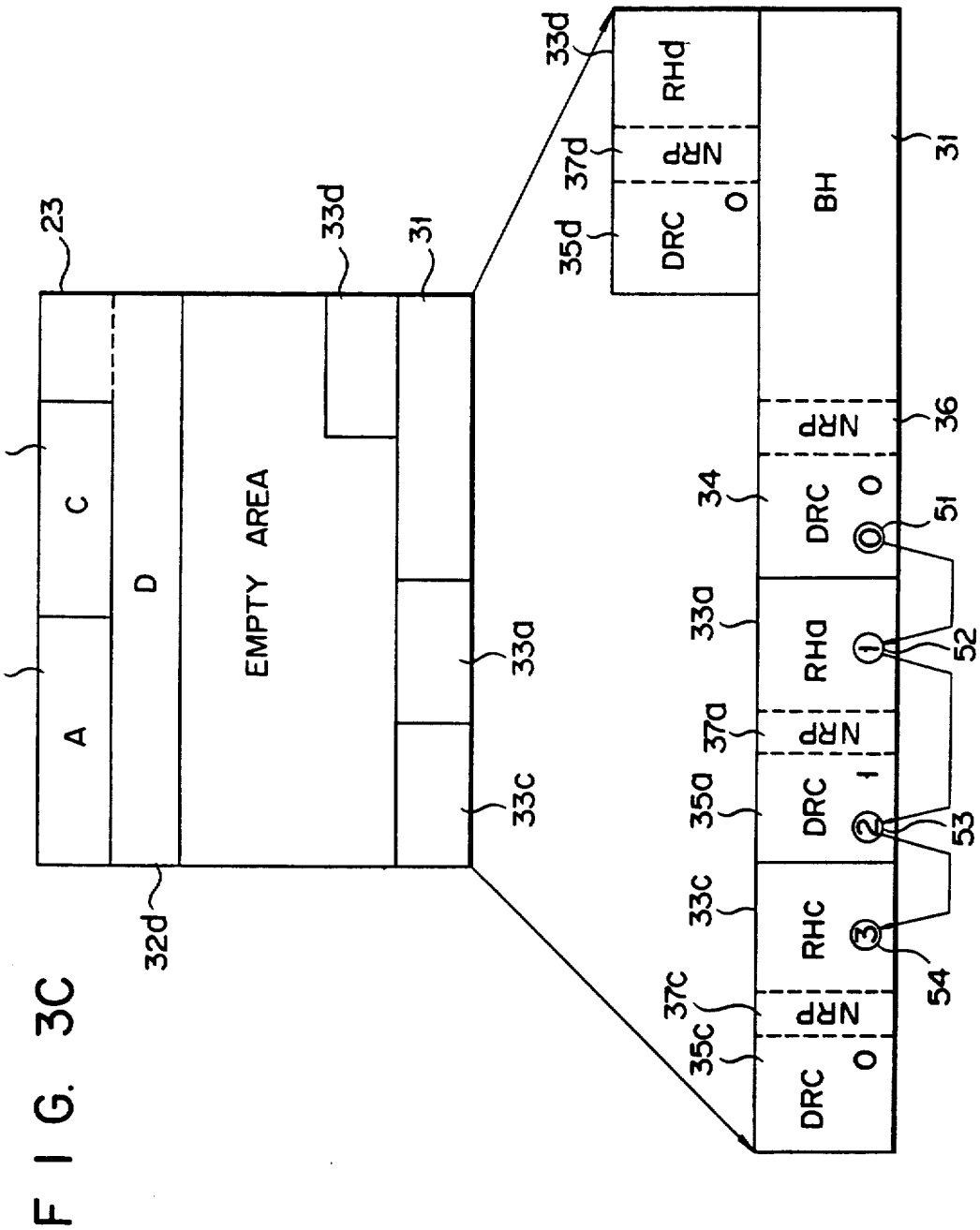
FIG. 3C is a view of a record storing state in a block for explaining how the record is searched for in accordance with the search instruction after a squeeze instruction is executed subsequent to the delete instruction in the embodiment shown in FIG. 2.

An operation of the embodiment of the present invention will be described with reference to a record storing state shown in FIGS. 3A to 3C, and flow charts shown in FIGS. 4 to 6.

As shown in FIG. 2, 4 records 32a (A), 32b (B), 32c (C), and 32d (D) are stored in block 23. Counter values of area 34 in header 31 (BH) and areas DRC 35a to 35d in headers 33a (RHa) to 33d (RHd) are all 0s, i.e., records are not yet deleted.

Records in block 23 are searched for in accordance with the storing order of record headers and the value of a delete record counter area (DRC) in the record header, and also with the counter value of record number counter 20, to be described later.

Assume that a search instruction is input so as to search for record 32c (C) which is stored in the 3rd logical order from the head of block 23 (step S2). In step S4, data of block 23 designated by the search instruction is read out from device 22 and stored in area 18 of memory 14. In addition, the leading position of header 31 (BH) in block 23 is set in pointer 16.

In step S6, header 31 (BH) in area 18 is referred to in accordance with the value of pointer 16, and data written in its area DRC 34 is written in counter 20. As shown in FIG. 3A, data of area DRC 34 is "0", and the content of counter 20 is also "0". The content of counter 20 is indicated by encircled numbers. In addition, data in area NRP 36 of header 31 is read out, and in accordance with readout data, the leading position of header 33a to be designated next is set in pointer 16.

In step S8, content N of counter 20 is incremented by "1" to become "1" as shown in circle 42. Then, in step S10, it is determined whether the content of counter 20 is equal to the logical record number designated by the search instruction. If Y (Yes) in step S10, step 14 is executed, and if N (No) in step S10, step S12 is executed. In this case, the designated logical number is 3 and the content of counter 20 is "1", so that step S12 is executed.

In step S12, the contents of area DRC 35a and area NRP 37a are read out from header RHa 33a. The content of pointer 16 is updated in accordance with the content of area NRP 37a so as to indicate the leading position of header 33b next. The content of counter 20 is updated in accordance with the content of area DRC 35a. In this case, since the content of DRC 35a is "0", the content of counter 20 remains the same.

Subsequently, step S8 is executed again, and the content of counter 20 is incremented by "1". As a result, the content of counter 20 becomes "2".

Operations from steps S8 to S12 are repeated until the value of counter 20 becomes "3" which is designated by the search instruction.

More specifically, as is apparent from FIG. 3A, the content of counter 20 becomes "3" and Y is determined in step S10 when header 33c is referred to. This coincides with the logical record number of record 32c to be searched for and Y is determined in step S10. Thereafter, in step S14, header 33c is referred to, and a record length and a position (relative position in the block) set in header 33c are read out. Pointer 16 is updated in accordance with the readout position data. In step S16, record 33c to be searched for is read out from block 23 in accordance with the content of updated pointer 16.

As described above, when no record is deleted and header 33c in the 3rd logical order from the head of the block is to be searched for, header 33c in the 3rd order from header 31 is referred to.

The case wherein record 32b is deleted from block 23, shown in FIG. 3A, will be described below.

When the delete instruction is input (step S22), the record designated in step S24 is deleted. Subsequently, in step S26, the corresponding record header is deleted. Thereafter, in step S28, the content of the record header immediately before the deleted record header is updated. In this case, the contents of area NRP 37a and area DRC 35a of header 33a are updated. That is, the fixed data length (by which next header 33b can be designated) of the record header has been written in area NRP 37a before execution of the delete instruction. After the delete instruction is executed, data indicating a length twice that of the fixed data length of the record header is written in area NRP 37a. Also, the content of area DRC35a of header 33a is updated in accordance with the delete instruction, based on the content of area DRC35b of deleted header 33b. As a result, the content of area DRC35a become "1" in this case. Therefore, when the search instruction is input, header 33c is searched for subsequent to header 33a. In addition, the content of area DRC 35a is incremented by "1", thereby obtaining matching of logical numbers between present header 33a and next header 33c.

An operation for executing the squeeze instruction in the state shown in FIG. 3B will be described below with reference to FIG. 6.

When the squeeze instruction is input (step S32), data in the block is squeezed in step S34. Thereafter, in step S36, the content of area NRP of the record header immediately before the squeezed record header is updated. That is, in the state shown in FIG. 3B, when the squeeze instruction is executed, data indicating the fixed data length of the record header is subtracted from the content of area NRP 37a of header 33a. Therefore, when the search instruction is executed, header 33c is referred to subsequent to header 33a. In the above manner, the record storing state of block 23 becomes as shown in FIG. 3C. An operation for searching for the record, the logical record number of which is 3 as in the previous case, when the record storing state of block 23 is shown in FIG. 3C, will be described below.

Figure 4:
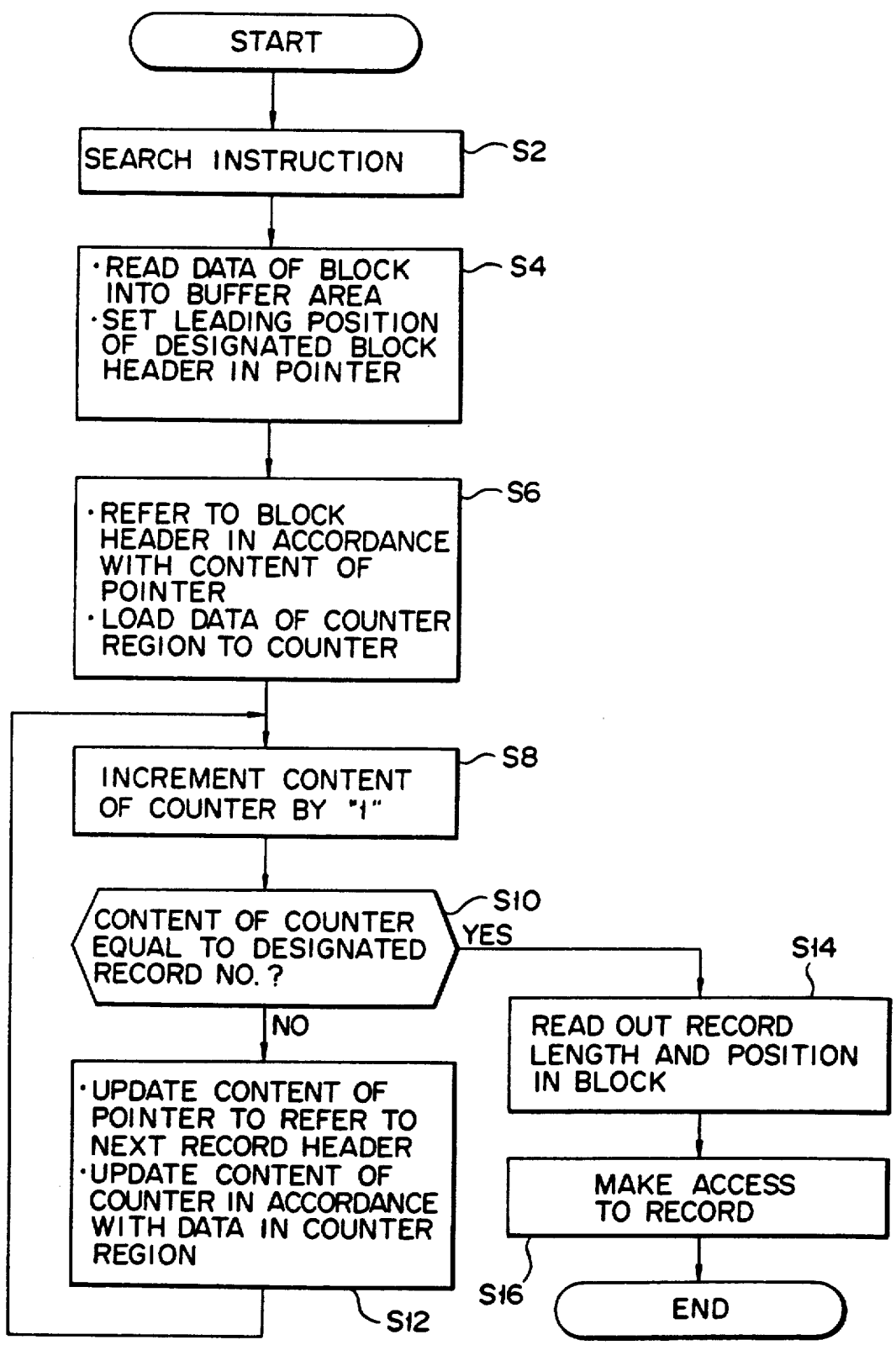
FIG. 4 is a flow chart for explaining how the record is searched for in accordance with the delete instruction.

Referring to FIG. 4, assume that the search instruction is input so as to search for record 33c (C) stored in the 3rd logical order from the head of block 23 (step S2). In step S4, data of block 23 designated by the search instruction is read out from device 22 and stored in area 18 of memory 14. In addition, the leading position of header 31 (BH) in block 23 is set in pointer 16.

In step S6, header 31 (BH) in area 18 is referred to in accordance with the value of pointer 16, and data written in area DRC 34 is written in counter 20. As shown in FIG. 3C, data of area DRC 34 is "0", and the content of counter 20 is also "0". In addition, data in area NRP 36 of header 31 is read out, and in accordance with the readout data, the leading position of header 33a to be designated next is set in pointer 16.

In step S8, content of counter 20 is incremented by "1" to become "1", as indicated by reference numeral 51. Then in step S10, it is determined whether the content of counter 20 is equal to the logical record number designated by the search instruction. If Y in step S10, step S14 is executed, and if N in step 10, step 12 is executed. In this case, the designated logical number is 3 and the content of counter 20 is "1", so that step S12 is executed.

In step S12, the contents of area DRC 35a and area NRP 37a are read out from header 33a RHa. At this time, the content of area DRC 35a has been updated to "1" in accordance with the delete instruction, and the content of area NRP 37a has been updated, in accordance with the delete instruction and the squeeze instruction, to data indicating the fixed data length of the record header. Therefore, in accordance with the content of area NRP 37a, the content of pointer 16 is updated to indicate the leading position of header 33b. In addition, the content of counter 20 is updated to "2" in accordance with the content of area DRC 35a.

Subsequently, step S8 is executed again, and the content of counter 20 is incremented by "1". As a result, the content of counter 20 becomes "3". Accordingly, Y is determined in step S10. Thereafter, in step S14, header 33c is referred to, and a record length and a position (relative position in a block) set in header 33c are read out. Pointer 16 is updated in accordance with the readout position. In step S16, record 33c to be searched for is read out from block 23 in accordance with the content of updated pointer 16.

As is apparent from the above description, even when the delete and squeeze instructions are executed, the logical storing order of records is not destroyed. Therefore, the record header of the record to be searched for can be easily searched for. That is, according to the above embodiment, since the delete history is recorded in the counter area DRC of the record header immediately before the deleted record header, the logical record order can be held by using the value of the counter area DRC even if the next record header is deleted, and the record header of the record to be searched for can be correctly referred to. As a result, the record stored in the 2nd physical order from the head of the block can be treated as the record stored in the 3rd logical order therefrom.

Note that in the above embodiment, data to be written in the area NRP of the header is relative position data, but the required areas may be reduced by storing the numbers using the length of the record header as a unit. Not a relative position but an absolute position may be written. In addition, the description has been made with reference to control of records in a file block in the above embodiment, but the present invention can be applied to general data control such as application software and, more particularly, to software wherein block name record processing is frequently performed.

What is claimed is:

1. A system for managing a file block, comprising:

storage means for storing said file block, which includes a plurality of record headers, a plurality of records respectively corresponding to said plurality of record headers and a block header, each said record being sequentially assigned with a record number, each said record header including first position data which represents a position of a corresponding record within the file block, second position data which represents a position of a record header to be referred to next within the file block, and delete history data which represents a number of record headers deleted between the record header and the record header to be referred to next, and said block header including the second position data and the delete history data;

search means, coupled to said storage means and responsive to an input search instruction which includes data indicating the record number assigned to an object record, for sequentially searching said block header and said plurality of record headers for an object record header corresponding to the object record, for determining whether the record number data coincides with the data indicating the record number designated by the input search instruction, by using the first position data and second position data and the delete history data in said record header which have already been searched, and the second position data and the delete history data in said block header, and for reading out the object record from said storage means; and control means coupled to said search means and responsive to an input read access command, for generating and outputting the search instruction to said search means.

2. A system according to claim 1, wherein said plurality of records are located in a record area of said file block, said block header is located in a last portion of said file block, and said plurality of record header are located in a header area of said file block, subsequent to said block header.

3. A system according to claim 2, wherein said plurality of record header are sequentially located from a last portion of said header area in accordance with the respective assigned record numbers.

4. A system for managing a file block, comprising:

storage means for storing said file block, which includes a plurality of record headers, a plurality of records respectively corresponding to said plurality of record headers and a block header, each said record being sequentially assigned with a record number, each said record header including first position data which represents a position of a corresponding record within the file block, second position data which represents a position of a record header to be referred to next within the file block, and delete history data which represents a number of record headers deleted between the record header and the record header to be referred to next, and said block header including the second position data and the delete history data;

search means, coupled to said storage means and responsive to an input search instruction which includes data indicating the record number assigned to an object record, for sequentially searching said block header and said plurality of record headers for an object record header corresponding to the object record, for determining whether the record number data coincides with the data indicating the record number designated by the input search instruction, by using the first position data and second position data and the delete history data in said record header which have already been searched, and the second position data and the delete history data in said block header, and for reading out the object record from said storage means;

control means coupled to said search means and responsive to an input read access command, for generating and outputting the search instruction to said search means; and delete means coupled to said storage means and said control means and responsive to an input delete instruction, for changing the second position data of a first header to that of a second header, said second header corresponding to a record designated by the delete instruction, and said first header being one of said block header and a record header which corresponds to a record not yet designated by the delete instruction and is located before said second header, and for adding the delete history data of said second header to that of the first header, and wherein said control means further comprises means responsive to an input delete command, for generating and outputting the delete instruction to said delete means.

5. A system according to claim 4, wherein said delete means further includes means for deleting the second header corresponding to the designated record.

6. A system according to claim 5, further comprising squeeze means responsive to an input squeeze instruction for squeezing said plurality of record headers into an empty area of the header area in a backward direction and wherein said control means further comprises means responsive to an input squeeze command, for generating and outputting the squeeze instruction to said squeeze means.

7. A system according to claim 4, wherein said delete means further includes means responsive to the delete instruction, for deleting the designated record.

8. A system according to claim 7, further comprising squeeze means responsive to an input squeeze instruction, for squeezing said plurality of records into an empty area of the record area in a forward direction and wherein said control means further comprises means responsive to an input squeeze command, for generating and outputting the squeeze instruction to said squeeze means.

9. A method for managing a file block, comprising under the control of a CPU the steps of:

storing, storage means, said file block, which includes a plurality of record headers, a plurality of records respectively corresponding to said plurality of record headers and a block header, each said record being sequentially assigned with a record number, each said record header including first position data which represents a position of a corresponding record within the file block, second position data which represents a position of a record header to be referred to next within the file block, and delete history data which represents a number of record headers deleted between the record header and the record header to be referred to next, and said block header including the second position data and the delete history data;

generating in response to a read access command, the search instruction which includes data indicating the record number assigned to an object record;

sequentially searching in response to a search instruction, said block header and said plurality of record headers for an object record header corresponding to the object record, for determining whether the record number data coincides with, the data indicating the record number designated by the input search instruction, by using the first position data and second position data and the delete history data in said record header which have already been searched and the second position data and the delete history data in said block header, for reading out the object record from said storage means.

10. A method according to claim 9, wherein said searching step comprises:

referring in response to the search instruction, to said block header and said plurality of record headers in accordance with the next header position data;

performing an updating operation for updating the number data by one each time one of said block header and said plurality of record headers is referred to;

determining whether the number data coincides with the record number data when the number data is updated in the updating operation;

reading out the object record from the file block in accordance with the first position data of a currently-referred record header when it is determined that the number data coincides with the record number data;

updating the number data in accordance with the delete history data when it is determined that the number data does not coincide with the record number data; and updating the next header position data in accordance with the second position data of the currently-referred record header when it is determined that the number data does not coincide with the record number data.

11. A method according to claim 9, wherein said plurality of records are located in a record area of said file block, said block header is located in a last portion of said file block, and said plurality of record headers are located in a header area of said file block, subsequent to said block header.

12. A method according to claim 11, wherein said plurality of record headers are sequentially located from a last portion of said header area in accordance with the respective assigned record numbers.

13. A method according to claim 9, further comprising:

changing in response to a delete instruction, the second position data of a first header to that of a second header, said second header corresponding to a record designated by the delete instruction, and said first header being one of said block header and a record header which corresponds to a record not yet designated by the delete instruction and is located before said second header; and adding in response to the delete instruction, the delete history data of said second header to that of the first header.

14. A method according to claim 13, further comprising deleting the second header corresponding to the designated record in response to the delete instruction.

15. A method according to claim 14, further comprising squeezing in response to a squeeze instruction, said plurality of record headers into an empty area of the header area in a backward direction.

16. A method according to claim 13, further comprising deleting the designated record in response to the delete instruction.

17. A method according to claim 16, further comprising squeezing in response to a squeeze instruction, said plurality of records into an empty area of the record area in a forward direction.

18. A system for managing a file block, comprising:

storage means for storing said file block, which includes a plurality of record headers, a plurality of records respectively corresponding to said plurality of record headers and a block header, each said record being sequentially assigned with a record number, each said record header including first position data which represents a position of a corresponding record within the file block, second position data which represents a position of a record header to be referred to next within the file block, and delete history data which represents a number of record headers deleted between the record header and the record header to be referred to next, and said block header including the second position data and the delete history data;

search means, coupled to said storage means and responsive to an input search instruction which includes data indicating the record number assigned to an object record, for sequentially searching said block header and said plurality of record headers for an object record header corresponding to the object record, said search means including:

first holding means for holding the next header position data;

second holding means for holding the number data;

referring means responsive to the search instruction, for sequentially referring to said block header and said plurality of record headers in accordance with said next header position data held in said first holding means;

first updating means for updating the number data held in said second holding means by one each time one of said block header and said plurality of record headers is referred to by said referring means;

determining means for determining whether the number data coincides with the record number data held in said second holding means when the number data is updated by said first updating means;

reading means for reading out the object record from said storage means in accordance with the first position data of a currently-referred record header when it is determined that the number data coincides with the record number data;

second updating means for updating the number data in accordance with the delete history data when it is determined that the number data does not coincide with the record number data; and third updating means for updating the next header position data in accordance with the second position data of the currently-referred record header when it is determined that the number data does not coincide with the record number data, and wherein said control means further comprises means for setting data indicating a position of said block header in said first holding means in response to the read access command; and control means coupled to said search means and responsive to an input read access command, for generating and outputting the search instruction to said search means.

* * * * *